US012122501B1

(12) United States Patent
Page

(10) Patent No.: US 12,122,501 B1
(45) Date of Patent: Oct. 22, 2024

(54) AIRCRAFT WITH CARBON FIBER MATERIAL AND A METHOD OF MANUFACTURE

(71) Applicant: JETZERO, INC., Long Beach, CA (US)

(72) Inventor: Mark Allan Page, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/242,862

(22) Filed: Sep. 6, 2023

(51) Int. Cl.
| | | |
|---|---|---|
| *B64C 1/12* | (2006.01) | |
| *B29C 65/48* | (2006.01) | |
| *B29C 65/62* | (2006.01) | |
| *B32B 5/06* | (2006.01) | |
| *B32B 5/12* | (2006.01) | |
| *B32B 5/26* | (2006.01) | |
| *B32B 37/12* | (2006.01) | |
| *B32B 38/18* | (2006.01) | |
| *B64C 39/10* | (2006.01) | |

(Continued)

(52) U.S. Cl.
CPC ............. *B64C 1/12* (2013.01); *B29C 65/48* (2013.01); *B29C 65/62* (2013.01); *B32B 5/073* (2021.05); *B32B 5/12* (2013.01); *B32B 5/26* (2013.01); *B32B 37/12* (2013.01); *B32B 38/1808* (2013.01); *B64C 39/10* (2013.01); *B32B 2038/008* (2013.01); *B32B 2260/023* (2013.01); *B32B 2260/046* (2013.01); *B32B 2262/106* (2013.01); *B32B 2305/18* (2013.01); *B32B 2313/04* (2013.01); *B32B 2605/18* (2013.01); *B64C 2001/0072* (2013.01); *B64C 2039/105* (2013.01)

(58) Field of Classification Search
CPC .............. B64C 1/12; B64C 2039/105; B64C 2001/072; B32B 5/073; B29C 65/62
USPC ........................................................ 244/126
See application file for complete search history.

(56) References Cited

U.S. PATENT DOCUMENTS

| | | | |
|---|---|---|---|
| 6,450,450 B1 * | 9/2002 | MacDonald | ............ B29C 70/24 |
| | | | 244/133 |
| 7,419,627 B2 | 9/2008 | Sheu | |
| 8,870,117 B2 | 10/2014 | Muñoz | |

(Continued)

FOREIGN PATENT DOCUMENTS

| | | | | |
|---|---|---|---|---|
| GB | 2552216 A | * | 1/2018 | ............ B64C 1/064 |
| WO | WO-2018142962 A1 | * | 8/2018 | ........... B29C 43/203 |
| WO | WO-2021019288 A1 | * | 2/2021 | |

OTHER PUBLICATIONS

Jegley, Development of the PRSEUS Multi-Bay Pressure Box for a Hybrid Wing Body Vehicle, 56th AIAA/ASCE/AHS/ASC Structures, Structural Dynamics, and Materials Conference, Jan. 2, 2015.

*Primary Examiner* — Christopher P Ellis
(74) *Attorney, Agent, or Firm* — Caldwell Intellectual Property Law

(57) ABSTRACT

A composite assembly for an aircraft, the composite assembly including a first carbon fiber material structured for a portion of an outer skin surface of an aircraft, a second carbon fiber material stitched to the first carbon fiber material, wherein the second carbon fiber material is structured for a structural component of the aircraft, and wherein the stitching is configured to bind the first carbon fiber material and the second carbon fiber material, and wherein the aircraft further includes a single deck, wherein a cargo compartment and a passenger compartment are located on or above the single deck.

18 Claims, 6 Drawing Sheets

(51) Int. Cl.
*B32B 38/00* (2006.01)
*B64C 1/00* (2006.01)

(56) References Cited

U.S. PATENT DOCUMENTS

| | | | |
|---|---|---|---|
| 10,730,252 B2* | 8/2020 | Cantwell | B29C 70/36 |
| 2009/0057487 A1* | 3/2009 | Velicki | B64C 1/064 |
| | | | 428/221 |
| 2011/0045232 A1* | 2/2011 | Kismarton | B29C 66/474 |
| | | | 428/113 |
| 2020/0247071 A1* | 8/2020 | Adachi | B29C 65/022 |
| 2022/0258853 A1 | 8/2022 | Linde | |
| 2023/0348036 A1* | 11/2023 | Page | B64C 9/00 |
| 2023/0348057 A1* | 11/2023 | Kawai | B64D 37/06 |
| 2023/0348091 A1* | 11/2023 | Kawai | F17C 1/14 |

* cited by examiner

AIRCRAFT WITH CARBON FIBER MATERIAL AND A METHOD OF MANUFACTURE

FIELD OF THE INVENTION

The present invention generally relates to the field of aviation. In particular, the present invention is directed to an aircraft having a composite assembly for an aircraft.

BACKGROUND

Aircraft typically utilize an aircraft skin made of aluminum or an aluminum alloy. Aircraft skins having aluminum or aluminum alloys are quite heavy and can reduce fuel efficiency of an aircraft. In addition, aircraft skins containing aluminum or aluminum alloys cannot be stitched to a structural frame of an aircraft.

SUMMARY OF THE DISCLOSURE

In an aspect, an exemplary composite assembly for an aircraft includes a first carbon fiber material structured for a portion of an outer skin surface of an aircraft, a second carbon fiber material stitched to the first carbon fiber material, wherein the second carbon fiber material is structured for a structural component of the aircraft, wherein the stitching is configured to bind the first carbon fiber material and the second carbon fiber material, and wherein the aircraft includes a single deck, wherein a cargo compartment and one or more passengers are located on or above the single deck.

In another aspect, an exemplary method of manufacture for a composite assembly for an aircraft includes structuring a first carbon fiber material for a portion of an outer skin surface of an aircraft, structuring a second carbon fiber material for a structural component of the aircraft, and stitching the second carbon fiber material to the first carbon fiber material, wherein the stitching further comprises binding the first carbon fiber material and the second carbon fiber material, and wherein the aircraft includes a single deck, wherein a cargo compartment and a passenger compartment are located on or above the single deck.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a composite assembly for a blended wing body aircraft to allow for a composite assembly to be stitched or attached to a structural element of a blended wing body aircraft. In an embodiment, composite assembly includes a resin matrix, a carbon fiber material, and a stitching to bind the carbon fiber material. In another embodiment composite assembly includes a plurality of layers.

Aspects of the present disclosure can be used to create portions of a blended wing body aircraft's outer skin. Aspects of this disclosure can further be used to stitch a portion of an outer skin to a structural element of a blended wing body aircraft.

Aspects of the present disclosure allow for use of blended wing body aircraft technology for air travel, by utilizing carbon fiber material to contain a pressure vessel. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 3. Furthermore, there is no intention to be bound by any expressed or implied theory presented in this disclosure.

Figure 1:
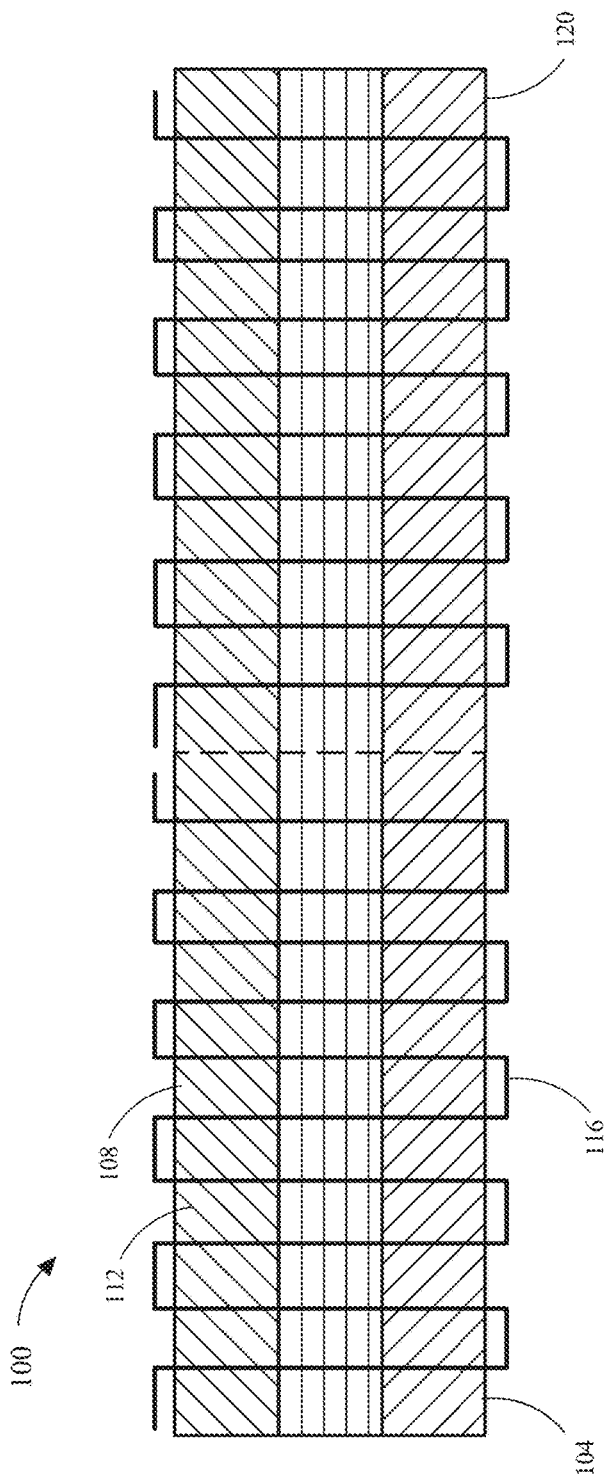
FIG. 1 illustrates a side view of an exemplary composite assembly for an aircraft in accordance with one or more embodiments of the present disclosure.

Referring now to FIG. 1, an exemplary embodiment of a composite assembly 100 for a blended wing body aircraft is illustrated. A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. "Composite assembly" as described herein refers to a component made up of two or more materials having differing material properties. For example, composite assembly 100 may refer to a composite wherein the composite contains a resin and a carbon fiber material.

With continued reference to FIG. 1, composite assembly 100 includes a first molded part 104, wherein first molded part 104 is structured for a portion of an outer skin surface of blended wing body aircraft. First molded part 104 includes a molded part. "Molded part" as described in this disclosure refers to a component that was created through a molding process in which a resin 108 was poured into a mold. In some embodiments, molded part may be cured such that resin is hardened creating a solid pliable or non-pliable material. In some embodiments, molded part may include an uncured part wherein molded part is not yet cured and is still in a liquid form. "Curing" as defined in this disclosure refers to the process of hardening or solidifying a material through a chemical reaction. When a part is cured, the part contains a solidified or hardened material. Curing may involve a substance that is capable of curing and a catalyst that is responsible for the curing. In a non-limiting example, a resin may be cured using a curing agent or a catalyst wherein the curing agent and the catalyst undergo a chemical reaction thereby producing a hardened material. In some cases, curing involves a substance that is heated. The process of curing using heat may be referred to as "heat curing". In some cases, heat curing may be used to speed up a process of a resin and a curing agent. In some cases, curing involves a resin and a hardener wherein the resin is a viscous liquid substance. In some cases, the resin is a natural or a synthetic organic compound. A hardener is responsible for the curing of the resin wherein the resin passes from a liquid state to a solid state through a chemical reaction. A "cured" part as described in this disclosure refers to a part that has been cured through a curing process. "Outer skin surface" for the purposes of this disclosure refers to an outer surface of aircraft. Outer skin surface may include an outer surface of wings, an outer surface of main body, an outer surface of a transition portion between the wings and the main body, and the like. A portion of outer surface may include only the outer surface of main body, only the outer surface of transition portion, only outer surface of wings and the like. Additionally, or alternatively, a portion of outer skin surface may portion of main body such that first molded part 104 is situated only on areas of main body that may require additional structural support. For example, portion of main body may include a surface around a window frame situated on main body wherein the surface around the window frame may require additional structural support. Portion of outer skin surface may further include material may include a portion of outer skin surface which may be more prone to structural damage. For example, a sections of outer skin surface containing an increased amount of force in comparison to other sections may benefit from first molded part 104. First molded part 104 may be placed in only those sections in which enhanced structural rigidity is required such that BWB does not carry any excess weight.

With continued reference to FIG. 1, first molded part 104 includes a carbon fiber material 112. "Carbon fiber material" as described in this disclosure is a material having carbon fibers. The carbon fibers may be spooled into carbon strands. In some cases, carbon fiber material includes a dry carbon fiber material. "Dry carbon fiber material" as described herein is carbon fiber material that has not been infused or impregnated with resin. This may be contrasted to a wet carbon fiber material wherein "wet carbon fiber material" is carbon fiber that has been impregnated or covered with a liquid resin. In some cases, a dry carbon fiber material may be preferred prior to molding in order to allow for stitching or other processes to be conducted on the carbon fiber material. In some cases, caron fiber material 112 may include a plurality of fibers that are stacked upon one another. In some cases, carbon fiber material may include a plurality of carbon fiber strands situated parallel to each other. In some cases, carbon fiber material may include a plurality of carbon fibers woven together to create a uniform fabric. In some embodiments, carbon fiber material 112 may include a composite material. A "composite material" as described in this disclosure refers to a material which is produced from two or more materials. For example, a composite material may include a plurality of carbon fiber strands that are woven with another material. In some embodiments, carbon fiber material 112 may include a carbon fiber lamina. A "lamina" for the purposes of this disclosure is a thin layer of material. For example, a lamina may be a thin layer of the composite material mentioned above. In some embodiments, carbon fiber material 112 may include a carbon fiber lamina, the carbon fiber lamina having a plurality of carbon fiber strands. Carbon fiber material 112 may further include a carbon fiber composite lamina wherein the carbon fiber composite lamina includes a thin layer of the plurality of carbon fibers combined with a resin. in some embodiments, carbon fiber material 112 may include a carbon fiber material 112 may further include a carbon fiber fabric. Carbon fiber fabric as described in this disclosure may refer to a plurality of carbon fiber strands wherein the strands are woven to create a fabric. In some embodiments, carbon fiber material 112 may include a plurality of layers, wherein each layer of the plurality of layers contains carbon fibers. the plurality of layers may be placed above each other in the same angular direction or in differing angular directions. In some embodiments, carbon fiber material 112 includes a plurality of fibers. Plurality of fibers may include a plurality of fiber strands wherein the fibers are spooled into fiber strands. Plurality of fibers may further include other fibers used for reinforcement of a composite. For example, plurality of fibers may include glass fibers, aramid fibers or basalt fibers. Plurality of fibers may be placed in a parallel direction wherein the fibers are all facing in one direction and are substantially parallel to each other. In some embodiments, plurality of fibers may be placed in a perpendicular direction wherein the fibers interlaced at a 90-degree angle.

With continued reference to FIG. 1, first molded part 104 includes a stitching 116, the stitching 116 structured to bind the carbon fiber material 112. "Stitching," as used as a noun, refers to a material that is sewn, or stitched, into at least a material, for example to bind two or more materials together. As used in this disclosure, "stitching," as used as a verb, is an act of interweaving at least a fiber between at least a material. In some embodiments, stitching 116 may prevent or minimize delamination of composite assembly 100 and/or carbon fiber material 112 under high stress environments. In some embodiments, stitching 116 reinforces composite assembly 100 or carbon fiber material 112 in the thickness direction. In some embodiments, stitching 116 may include stitching 116 properties such as stitch material, stitch density, thread density and the like. Stitching 116 may include stitch material such as polyester, thermoplastics, carbon fiber material 112, carbon fiber strands and the like. Stitch density as described in this disclosure refers to the number of stitches over a given area. A higher stitch density may minimize possibilities of delamination in composite assembly 100. "Thread density" as described herein refers to the density of the thread used for stitching 116. In some embodiments, stitching 116 may include a modified lock stitch, a chain stitch, or a lock stitch. In some embodiments, stitching 116 may minimize damage of composite assembly 100 by containing the delamination to a specific area and not allowing the delamination to spread. In some embodiments, stitching 116 may help minimize misalignment of carbon fiber material 112. In some cases, stitching carbon fiber material may include stitching a dry carbon fiber material 112 wherein the carbon fiber material 112 is stitched together prior to any infusion or addition of a resin. In some cases, carbon fiber material 112 may be stitched prior to molding and after molding as well. In some cases, stitching 116 is structured to bind dry carbon fiber material as described herein. In some cases, stitching 116 may be structured to bind a plurality of layers of dry carbon fiber material together in the thickness direction. In some cases, stitching 116 is structured to bind a stack of carbon fiber material wherein the stack of carbon fiber material may be viewed as one uniform part after stitching. In some cases, carbon fiber material 112 includes a plurality of dry carbon fiber material that is held together through stitching 116.

In some embodiments, first molded part 104 may include a composite laminate having a plurality of layers. "Composite laminate" as described herein refers to a plurality of composites wherein each composite is a thin layer, or lamina. In some embodiments, at least one of the plurality of layers contains the resin matrix 108 and the carbon fiber material 112. In some embodiments, first molded part 104 may include a composite laminate wherein more than one of the plurality of layers contains the resin matrix 108 and the carbon fiber material 112. The plurality of layers of composite laminate may be held together through the use of a binding agent, such as an epoxy, stitching 116, nails, glue or the like. Composite laminate may have a quasi-isotropic layup. In some embodiments, the plurality of layers may have a quasi-isotropic layup. A "quasi-isotropic layup" as described in this disclosure is a composite laminate having a plurality of layers wherein the orientation of the one or more composite lamina are balanced such that there is a constant strength and stiffness of the composite laminate regardless of the direction in which a force is applied. For example, a quasi-isotropic layup may include a symmetrical composite laminate having 4 laminae wherein the lamina are oriented at angles of 0°/−45°/+45°/90°. In some embodiments, first molded part 104 may include a composite laminate wherein each lamina contains the same or substantially similar material. In some embodiments, first molded part 104 may include a composite laminate wherein each lamina contains one or more different materials. In some embodiments, the composite laminate may be stitched wherein the stitching 116 extends through the thickness of the composite laminate such that the stitching 116 extends through the plurality of layers. In some embodiments, stitching 116 is structured to bind the plurality of layers.

With continued reference to FIG. 1, first molded part 104 includes a resin matrix 108, wherein carbon fiber material 112 is embedded in resin matrix 108. "Resin" as described in this disclosure is a compound consisting of a non-crystalline or viscous liquid substance. Resin may be reacted with a curing agent or a hardener in order to create a solid material. Curing agent or hardener may include aliphatic amines, polyamides amines, aromatic amines, anhydrides, imidazoles, lewic acids, peroxides, and the like. In some embodiments, resin may include vinylester resins, epoxy resins or any other lightweight resins with durability suitable for aircraft. "Matrix" as described herein is a constituent of a composite material that binds fibers and provides the composite a shape. In a resin matrix 108, such as the resin matrix 108 described in this disclosure, the resin binds the fibers and provides the composite its shape. Carbon fiber material 112 may be embedded into the resin matrix 108. "Embedded" as described herein refers to a state in which a material is partially or completely surrounded by another material. For example, a fiber may be embedded within a resin such that the material is completely surrounded by the resin, or the fiber may be embedded within a resin such that the material is partially surrounded by a resin and contains a portion that is situated outside of the resin. Carbon fiber material 112 may be embedded within the resin matrix 108 such that carbon fiber material 112 is completely surrounded by the resin matrix 108. In some embodiments, carbon fiber material 112 may be embedded such that a portion, section or edge of carbon fiber material 112 is protruding out of resin matrix 108. Carbon fiber material 112 may include an uninfused portion wherein the uninfused portion is not wetted by the resin. The uninfused portion may be situated outside of the resin matrix 108. The uninfused portion may be situated at a first end of carbon fiber material 112 and extending toward a second end of carbon fiber material 112. In some cases, stitching 116 and carbon fiber material are embedded within resin matrix 108. In some cases, carbon fiber material 112 may have a plurality of layers, wherein the plurality of layers may contain a stitching 116, the carbon fiber material embedded within resin matrix. In such an embodiment, carbon fiber material may contain a plurality of layers within a single resin matrix. This may be contrasted to a plurality of carbon fiber materials 112 embedded into a plurality of resin matrixes, wherein the resin matrixes are bound together using an epoxy or an adhesive of some sort as described in this disclosure. In some cases, carbon fiber material 112 may include a dry carbon fiber material wherein stitching 116 and carbon fiber material 112 is embedded within resin matrix.

With continued reference to FIG. 1, first molded part 104 may include a stitched resin infused carbon fiber cloth. As described in this disclosure, "stitched resin infused carbon fiber cloth" is a dry fibrous material, such as dry carbon fiber, that is stitched together prior to embedding the carbon fiber material into a resin matrix. Stitched resin infused carbon fiber cloth may include a plurality of layers of carbon fiber material 112, wherein the plurality of layers may be stitched together in the thickness direction in order to prevent delamination or movement of carbon fiber material 112. In some cases, the plurality of layers of carbon fiber material 112 comprises a plurality of layers of dry carbon fiber material. This may be contrasted to wet carbon fiber material or pre-impregnated carbon fiber material wherein the carbon fiber material has already been in contact with a resin. In some cases, stitched resin infused carbon fiber cloth includes a plurality of dry carbon fiber material that is stitched together in the thickness direction and infused with a resin using a resin transfer molding process. As opposed to a process in which carbon fiber material is stitched after infusion, or after molding as described in this disclosure, stitched resin infused carbon fiber cloth may be stitched prior to any resin coming into contact with carbon fiber material 112. Stitched resin infused carbon fiber cloth may include a resin transfer molding process as described below. Stitched resin infused carbon fiber cloth may include a resin transfer molding process, wherein carbon fiber material is embedded into a resin matrix by injecting a resin into a mold having carbon fiber material or a stitched carbon fiber material. Stitched resin infused carbon fiber cloth may include a composite laminate wherein the composite laminate is held together and reinforced with stitching 116. Stitched resin infused carbon cloth may further include a composite having a single layer. Stitched resin infused carbon cloth may include stitching 116 wherein the stitching 116 binds the plurality of layers of the composite laminate. First molded part 104 may be stitched using a modified lock stitch, a lock stitch, a chain stitch or the like. Stitched resin infused carbon fiber cloth may be a pliable material. Alternatively, stitched resin infused carbon fiber cloth may be a non-pliable material. Stitched resin infused carbon fiber cloth may be stitched using stitching 116 as described in this disclosure. In some embodiments, stitched carbon infused carbon fiber cloth may include non-crimped fabric. "Non-crimped fabric" as described herein refers to a dry fabric that is stitched prior to being embedded into a resin. Additionally, or alternatively, stitched resin infused carbon fiber cloth may include stitching 116 through the fabric and the resin, wherein the stitching 116 is structured to bind the plurality of layers together. "Resin infused" as described herein refers to a composite that was created through an infusion process, typically a vacuum infusion process as will described in greater detail below. In some embodiments, a resin infused composite is a composite created within a mold wherein a carbon fiber material 112 was placed in the mold and the resin was poured onto the carbon fiber material 112 within the mold. Resin infused may include a composite that has been fully cured wherein the composite is no longer a liquid or malleable material. Resin infused may further include a composite that has not yet been cured in which the composite can still be shaped formed or molded prior to curing. Resin infused will be described in greater detail below.

With continued reference to FIG. 1, first molded part 104 may include a pre-impregnated carbon fiber material 112. "Pre-impregnated" as described herein refers to a composite that has not yet been fully cured. As opposed to dry carbon fiber as described above, pre-impregnated carbon fiber material 112 may include resin and carbon fiber material 112 embedded within resin. Pre-impregnated carbon fiber material 112 may be malleable such that pre-impregnated carbon fiber material 112 may still be formed and shaped prior to curing. Pre-impregnated carbon fiber material 112 may include a single layer or a plurality of layers. Pre-impregnated carbon fiber material 112 may further contain a catalyst wherein the catalyst is configured to cure the resin above a particular temperature. In some embodiments, pre-impregnated carbon fiber material 112 includes a thermoplastic resin or a thermoset resin wherein the resin only cures above a certain temperature. In some embodiments, first molded part 104 may include a pre-impregnated carbon fiber material 112 wherein carbon fiber material 112 are coated with a thermoplastic resin or thermoset resin. In some embodiments, pre-impregnated carbon fiber material 112 may be malleable such that pre-impregnated carbon fiber material 112 may be placed into a mold and take the form of the mold. In some cases, pre-impregnated carbon fiber material 112 may be cured and hardened using heat. Pre-impregnated carbon fiber material 112 is described in further detail below.

With continued reference to FIG. 1, composite assembly 100 includes a second molded part 120. Second molded part 120 may be consistent with molded part as described above. Second molded part 120 may further include a resin as described above. Second molded part 120 may further include carbon fiber material 112 as described above. Second molded part 120 may further include resin infused carbon fiber cloth as described above. In some embodiments, second molded part 120 is substantially similar to first molded part 104. In some embodiments, second molded part 120 contains carbon fiber material 112 having a differing orientation as carbon fiber material 112 of first molded part 104.

With continued reference to FIG. 1, second molded part 120 is adhered to first molded part 104. "Adhered" as described herein refers to any process that may bind second molded part 120 to first molded part 104. For example, second molded part 120 may be adhered to first molded part 104 through an adhesive, through stitching 116, through riveting, and the like. Second molded part 120 may be adhered to first molded part 104 at a joining region. "Joining region" as described herein is a region containing a portion of first molded part 104 and a portion of second molded part 120. Portion of first molded part 104 may include an edge of first molded part 104, an end, a section, and the like. Portion may further include uninfused portion of carbon fiber material 112 as described above. Similarly, portion of second molded part 120 may include an edge of second molded part 120, an end, a section, and the like. portion may further include uninfused portion of carbon fiber material 112 as described above. Joining region may include an uninfused portion of first molded part 104 and an uninfused portion of second molded part 120, wherein the uninfused portion of first molded part 104 and uninfused portion of second molded part 120 are molded together. In some embodiments, composite assembly 100 includes a unified molded part. "Unified molded part," as used in this disclosure, refers to a part including more than one carbon fiber material that has been molded together to create a single part. Unified molded part may include molding first molded part 104 and second molded part 120 through joining region to create a single mold. Unified molded part may further include adhering an uncured first molded part 104 and an uncured second molded part 120 and curing the uncured first molded part 104 and second molded part 120 simultaneously. In some embodiments, unified molded part may include joining region wherein joining comprises a resin, the resin configured to adhered first molded part 104 to second molded part 120. Joining region is discussed in further detail in this disclosure. Additional disclosure on joining regions and composites may further be found in U.S. patent application Ser. No. 18/118,827, filed on Mar. 8, 2023, and titled "AIRCRAFT WITH COMPOSITE ASSEMBLY AND A METHOD OF MANUFACTURE," the entirety of which is incorporated by reference herein.

Figure 2:
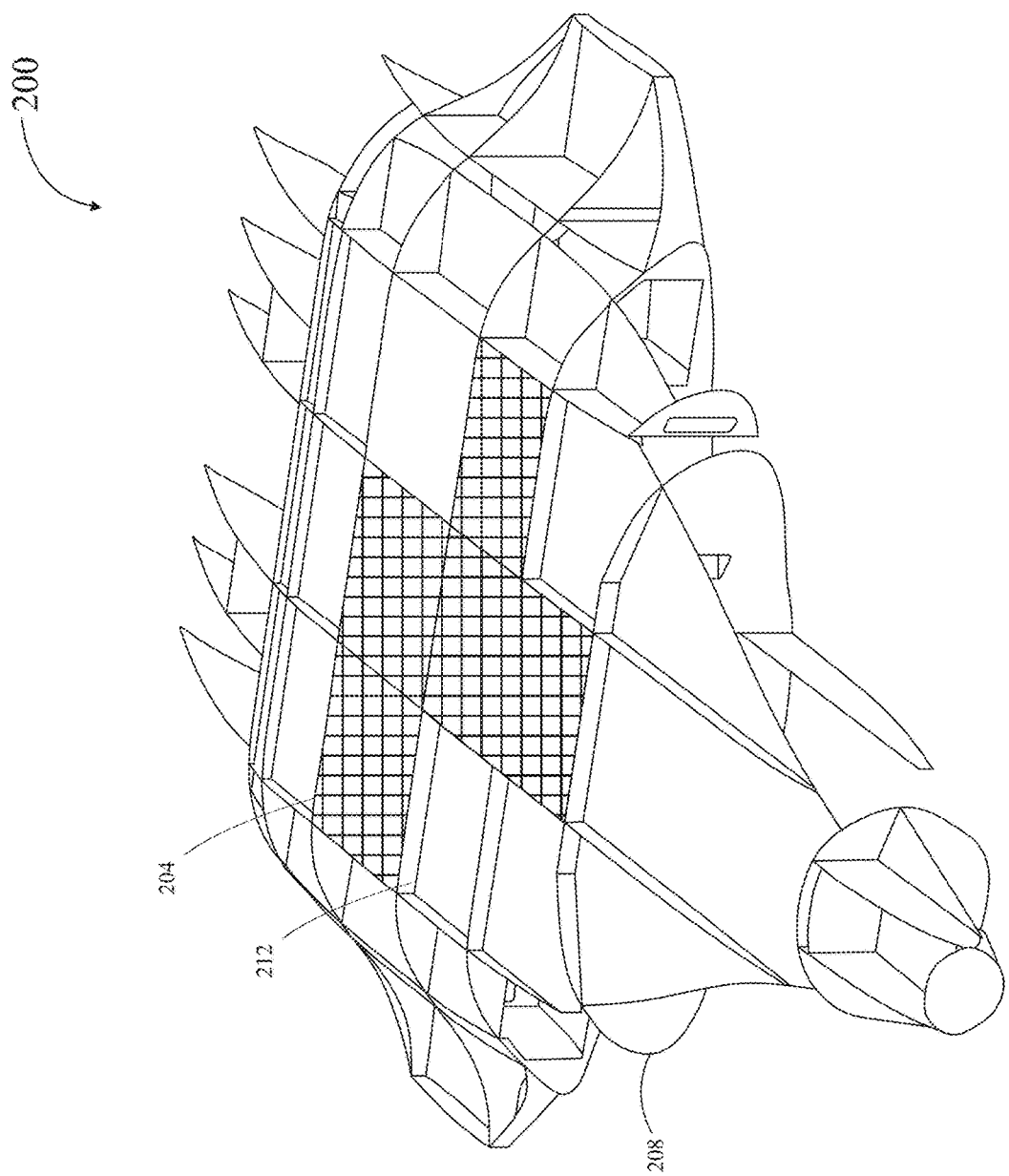
FIG. 2 is a schematic illustration of a perspective view of an airframe of the blended wing body aircraft with composite assembly attached thereto in accordance with one or more embodiments of the present disclosure.

Referring now to FIG. 2, an exemplary embodiment of a composite assembly 204 on a blended wing body aircraft 200 is illustrated. Composite assembly 204 is attached to a structural element 212 of blended wing body aircraft 200, wherein blended wing body aircraft 200 having no clear demarcation between wings and a main body along a leading edge of the blended wing body aircraft 200. A "structural element" for the purposes of this disclosure refers to a component used to provide stability during an entirety of a flight, while on ground, and during normal operations. Structural element 212 may include struts, beams, beams, formers, stringers, longerons, interstitials, ribs, structural skins, doublers, straps, spars, or panels and the like. Structural element 212 may further include support around an aircraft window configured to provide extra stability around weak points in the aircraft's structure. Structural element 212 may include a skeletal frame of blended wing body 208. "Skeletal" frame as described in this disclosure refers to an internal structure of BWB 208 that makes up the framework of blended wing body 208. Skeletal frame may be made of wood, metal, plastics, composites and the like. In some embodiments, composite assembly 204 is attached to structural element 212 such that composite assembly 204 is attached to a stringer of blended wing body 208. Additionally, or alternatively, composite assembly 204 may be attached to structural element 212 such that structural element 212 is attached to a former of blended wing body 208. Composite assembly 204 may be stitched to structural element 212. Composite assembly 204 may be stitched using a pliable material. Composite assembly 204 may be stitched using any stitching or stitching method as described in this disclosure. In some embodiments composite assembly 204 is stitched to structural element 212 wherein a plurality of protrusions extends through composite assembly 204 such that stitching is passed through the protrusions and around/through structural element 212. Composite assembly 204 is then adhered to structural element 212 through stitching. In some embodiments, composite assembly 204 is further stitched to a second composite assembly 204. Stitching may include a single fiber or string having a continuous length wherein the single fiber passed though the protrusions within composite assembly 204 and around structural element 212. In some embodiments, composite assembly 204 may include a carbon fiber cloth. Carbon fiber cloth may be wrapped around structural element 212 and stitched to composite assembly 204. A first and second end of carbon fiber cloth may be stitched to composite assembly 204. Additionally, or alternatively, carbon fiber cloth may blanket structural element 212. Stitching may further include any stitching method as described herein.

With continued reference to FIG. 2, Composite assembly 204 may be attached to structural element 212 through riveting. In some embodiments, composite assembly 204 is riveted to a structural element 212 such that rivet extends through protrusions within composite assembly 204 into structural element 212. Rivet may include a metal, metal alloy, composite, or another high strength material with similar properties. In some cases, composite assembly 204 may be riveted to structural element 212 such that composite assembly 204 may be adhered to structural element 212 under high stress environments, such as during a flight.

With continued reference to FIG. 2, in some embodiments composite assembly 204 may be configured to contain a pressure vessel. "Pressure vessel" as described in this disclosure is a closed container, compartment, storage, or vessel that is designed to withstand pressures higher or lower than the surrounding atmosphere. For example, at higher altitudes an interior of main body may contain a large pressure difference in comparison to the atmospheric pressure such that main body is a pressure vessel. "Contain a pressure vessel" as described in this disclosure refers to the process of providing structural support to a pressure vessel such that the pressure difference within the pressure vessel is maintained. For example, containing a pressure vessel may include preventing the pressure vessel from balancing the pressure of the pressure vessel with the atmospheric pressure. Composite assembly 204 may be configured to contain pressure vessel such that pressure vessel is closed to the atmosphere. Composite assembly 204 may further be configured to contain pressure vessel such that pressure vessel is not crushed due to the pressure difference between pressure vessel and the atmosphere. In some embodiments, outer skin surface may contain pressure vessel. In some embodiments, main body may be configured to contain a pressure vessel. Additionally, or alternatively composite assembly 204 may include a portion of main body wherein main body is configured to contain a pressure vessel.

Figure 3:
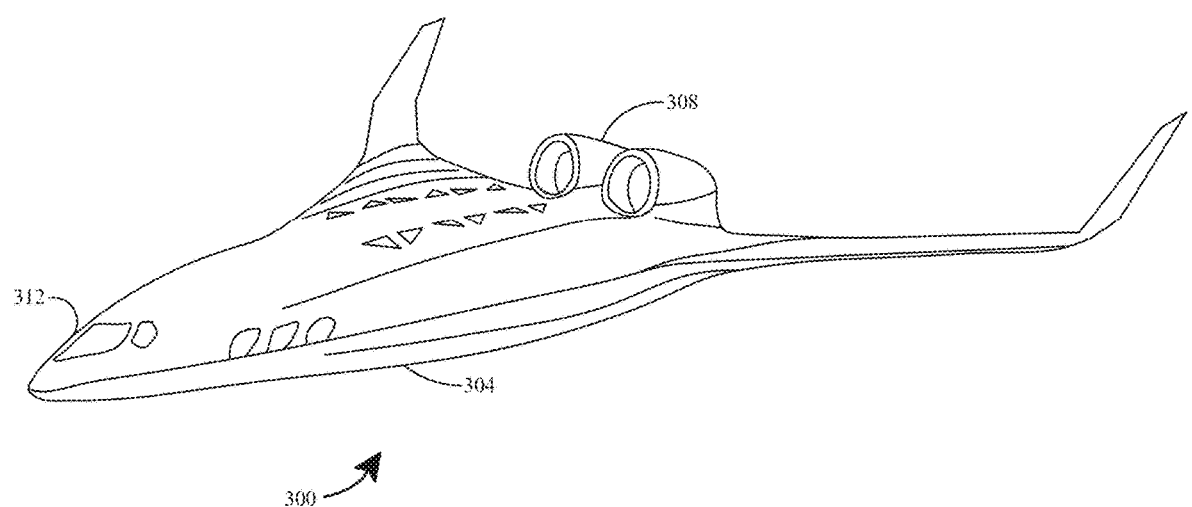
FIG. 3 is a schematic of an exemplary blended wing aircraft.

Referring to FIG. 3, an exemplary blended wing aircraft 300 is illustrated. Aircraft 300 may include a blended wing body 304. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 304 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 304 design may or may not be tailless. One potential advantage of a BWB 304 may be to reduce wetted area and any accompanying drag associated with a conventional wing-body junction. In some cases, a BWB 304 may also have a wide airfoil-shaped body, allowing entire aircraft to generate lift and thereby facilitate reduction in size and/or drag of wings. In some cases, a BWB 304 may be understood as a hybrid shape that resembles a flying wing, but also incorporates features from conventional aircraft. In some cases, this combination may offer several advantages over conventional tube-and-wing airframes. In some cases, a BWB airframe 304 may help to increase fuel economy and create larger payload (cargo or passenger) volumes within the BWB. BWB 304 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 3, BWB 304 of aircraft 300 may include a nose portion. A "nose portion," for the purposes of this disclosure, refers to any portion of aircraft 300 forward of the aircraft's fuselage. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 3, BWB 304 may include at least a structural component of aircraft 300. "Structural component" as described in this disclosure is a weight bearing support that is configured to resist pressurization loads of a main body of a BWB 304 and reduce skin bending loads. Structural components may provide physical stability during an entirety of an aircraft's 300 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 300 structure, they may be so named A, B, C, and so on named from nose to tail. Pillars, like any structural element, may be disposed a distance away from each other, along an exterior of aircraft 300 and BWB 304. Depending on manufacturing method of BWB 304, pillars may be integral to frame and skin, comprised entirely of internal framing, or alternatively, may be only integral to structural skin elements. Structural skin will be discussed in greater detail below.

With continued reference to FIG. 3, main body of BWB 304 may have a single deck, wherein the passengers and cargo are both located on or above the single deck. (i.e., single passenger and cargo floor). In some cases, BWB 304 may have a single deck wherein a passenger compartment and a cargo compartment are located on or above the single deck. A "single deck" for the purposes of this disclosure, refers to a flat deck within the interior of an aircraft. This may be contrasted with a tube and wing aircraft having cargo and/or a cargo compartment beneath the deck of the aircraft. Single deck may represent a floor of a cargo bay of BWB 304. In some cases, cargo may be placed within cargo bay which may be located atop single deck. In some cases, a cargo compartment may be located on single deck. In some cases, a passenger compartment may be located on single deck. Single deck may serve as the contiguous wall between cargo bay and another portion of aircraft 300. The term "contiguous" means the bottom surface of cargo bay and the bottom of aircraft 300 share at least a common border. A passenger compartment may be contained within the space on either side or both sides of cargo bay. In some embodiments, cargo and one or more passengers are located on or above single deck. Cargo bay may be located on single deck wherein cargo bay holds cargo. Additionally or alternatively passenger compartment may be located within cargo bay wherein passenger compartment is located on or above single deck with cargo bay. In some embodiments, main body of BWB 304 may include more than one deck wherein one or more passengers are located above cargo. For example, main body of BWB 304 may include more than one deck wherein passengers are located on an upper deck and cargo bay having cargo is located on a lower deck. A height h of cargo bay may allow for a passenger compartment to be disposed within an upper portion of aircraft 300 while still allowing for ample headspace for passengers. The size of passenger compartment relative to an interior cavity may be based on requirements for passenger capacity versus cargo capacity. For example, and without limitation, if more cargo is required to be transported, then passenger compartment may only hold several passengers to allow for more storage of cargo.

With continued reference to FIG. 3, BWB 304 may include a plurality of materials, alone or in combination, in its construction. At least a BWB 304, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 304 may comprise aluminum tubing mechanically coupled in various orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 304 may additionally or alternatively use wood or another suitably strong yet light material for an internal structure.

With continued reference to FIG. 3, aircraft 300 may include monocoque or semi-monocoque construction. BWB 304 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e., above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 3, BWB 304 may include at least a fuselage. A "fuselage," for the purposes of this disclosure, refers to a main body of an aircraft 300, or in other words, an entirety of the aircraft 300 except for nose, wings, empennage, nacelles, and control surfaces. In some cases, fuselage may contain an aircraft's payload. At least a fuselage may comprise structural components that physically support a shape and structure of an aircraft 300. Structural components may take a plurality of forms, alone or in combination with other types. Structural components vary depending on construction type of aircraft 300 and specifically, fuselage. A fuselage 312 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 3, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 300. In some cases, the former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 300 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 3, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 3, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials.

Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 3, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 3, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 3, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 304. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 3, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 300 is in its level flight orientation or sitting on ground. A post may act similarly to stringer in that it is configured to support axial loads in compression due to a load being applied parallel to its axis due to, for example, a heavy object being placed on a floor of aircraft 300. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 3, aircraft 300 may include at least a flight component 308. A flight component 308 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 300 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 300. In some embodiments, at least a flight component 308 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 3, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 3, at least a flight component may be one or more devices configured to affect aircraft's 300 attitude. "Attitude", for the purposes of this disclosure, is the relative orientation of a body, in this case aircraft 300, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 300. A plurality of attitude datums may indicate one or more measurements relative to an aircraft's pitch, roll, yaw, or throttle compared to a relative starting point. One or more sensors may measure or detect an aircraft's 300 attitude and establish one or more attitude datums. An "attitude datum", for the purposes of this disclosure, refers to at least an element of data identifying an attitude of an aircraft 300.

With continued reference to FIG. 3, in some cases, aircraft 300 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively, or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 3, in some cases, aircraft 300 may include at least a pilot control. As used in this disclosure, a "pilot control," is an interface device that allows an operator, human or machine, to control a flight component of an aircraft. Pilot control may be communicatively connected to any other component presented in aircraft 300, the communicative connection may include redundant connections configured to safeguard against single-point failure. In some cases, a plurality of attitude datums may indicate a pilot's instruction to change heading and/or trim of an aircraft 300. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 300. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 308 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 3, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 308. At least a flight component 308 may include any propulsor as described herein. In embodiment, at least a flight component 308 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 3, at least a sensor may include a moisture sensor. "Moisture", as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 3, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor," for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 3, at least a flight component 308 may include wings, empennages, nacelles, control surfaces, fuselages, and landing gear, among others, to name a few. In embodiments, an empennage may be disposed at the aftmost point of an aircraft body 304. Empennage may comprise a tail of aircraft 300, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 300 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 300 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 304 aircraft 300 where no strong delineation of body and wing exists. A wing's cross section geometry may comprise an airfoil. An "airfoil" as used in this disclosure, is a shape specifically designed such that a fluid flowing on opposing sides of it exerts differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g., length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 308 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 308 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 300. Such devices increase an effective aspect ratio of a wing without greatly increasing wingspan. Extending wingspan may lower lift-induced drag but would increase parasitic drag and would require boosting the strength and weight of the wing. As a result, according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 300 and pose a hazard to other aircraft. Minimum spacing requirements between aircraft at airports are largely dictated by hazards, like those from wake vortices. Aircraft are classified by weight (e.g., "Light," "Heavy," and the like) often based upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 3, aircraft 300 may include an energy source. Energy source may include any device providing energy to at least a flight component 308, for example at least a propulsor. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 3, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, fluid fuel, a plasma fuel, and the like. As used in this disclosure, a "fuel" may include any substance that stores energy. Exemplary non-limiting fuels include hydrocarbon fuels, petroleum-based fuels., synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 304 of aircraft 300, for example without limitation within a wing portion 312 of blended wing body 308. Aviation fuels may include petroleum-based fuels, or petroleum and synthetic fuel blends, used to power aircraft 300. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 300. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 3, modular aircraft 300 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 3, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 4 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 3, aircraft 300 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 3, aircraft 300 may include multiple flight component 308 sub-systems, each of which may have a separate energy source. For instance, and without limitation, one or more flight components 308 may have a dedicated energy source. Alternatively, or additionally, a plurality of energy sources may each provide power to two or more flight components 308, such as, without limitation, a "fore" energy source providing power to flight components located toward a front of an aircraft 300, while an "aft" energy source provides power to flight components located toward a rear of the aircraft 300. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 308. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 3, aircraft 300 may include a flight component 308 that includes at least a nacelle 308. For the purposes of this disclosure, a "nacelle" is a streamlined body housing, which is sized according to that which is houses, such as without limitation an engine, a fuel store, or a flight component. When attached by a pylon entirely outside an airframe 304 a nacelle may sometimes be referred to as a pod, in which case an engine within the nacelle may be referred to as a podded engine. In some cases, an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 300 partially or wholly enveloped by an outer mold line of the aircraft 300. At least a nacelle may be designed to be streamlined. At least a nacelle may be asymmetrical about a plane comprising the longitudinal axis of the engine and the yaw axis of modular aircraft 300.

With continued reference to FIG. 3, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 3, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 3, in nonlimiting embodiments, at least a flight component 308 may include an airbreathing engine such as a jet engine, turbojet engine, turboshaft engine, ramjet engine, scramjet engine, hybrid propulsion system, turbofan engine, or the like. At least a flight component 308 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 3, an aircraft 300 may include a flight controller. As used in this disclosure, a "flight controller" is a device that generates signals for controlling at least a flight component 308 of an aircraft 300. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 3, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 300 and/or computing device.

With continued reference to FIG. 3, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
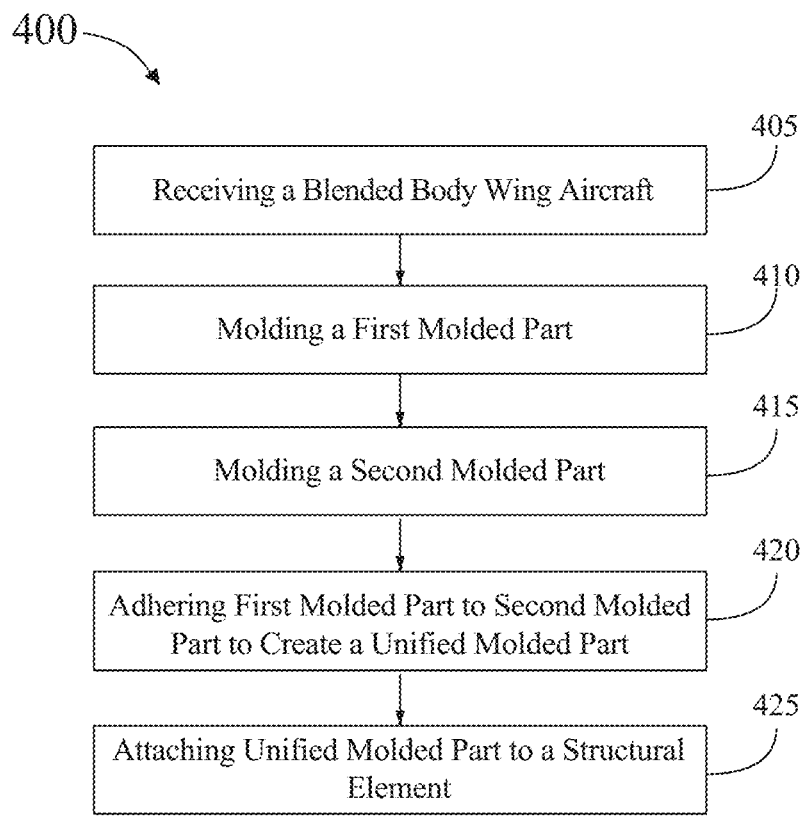
FIG. 4 is a flow diagram of an exemplary method of manufacture of a composite assembly for an aircraft.

Referring to FIG. 4, a method 400 of manufacture of a composite assembly for a blended wing body aircraft is illustrated by way of a flow diagram. At step 405, method 400 includes receiving a blended wing body aircraft having a main body and wings with no clear demarcation between the wings and the main body along a leading edge of the aircraft. In some embodiments, receiving blended wing body may include assembling blended wing body wherein blended wing body is constructed from a plurality of components. The plurality of components may be manufactured, purchased, received or the like. This may be implemented as disclosed with reference to FIGS. 1-3.

With continued reference to FIG. 4, at step 410, method 400 includes molding a first molded part, the first molded part structured for a portion of an outer skin surface of a blended wing body. Molding the first molded part includes receiving a carbon fiber material, stitching the carbon fiber material to create a stitched carbon fiber material, placing the stitched carbon fiber material into a mold and pouring a resin into the mold, the stitched carbon fiber material embedded into the mold. In some embodiments, molding the first molded part may include a layup molding method. In some cases, carbon fiber material may include a dry carbon fiber material. Layup molding method may include A wet layup or a dry layup. A "wet layup" as described in this disclosure is a method in which a carbon fiber material or a reinforcement material is created by pouring a resin on top of a dry fabric such as carbon fiber. The resin may be mixed with a catalyst prior to pouring in order to create a solid material. The poured resin is rolled to remove pockets and dried to create a solid composite laminate. The composite laminate may be a pliable or non-pliable material. A wet layup may consist of multiple layers wherein each layer may comprise a similar or different material. "Dry layup" as described herein is a method in which a plurality of dry fibers such as carbon fiber material is placed on top of each other to form a stack of layers. Then a resin is infused into the stack of layers. In some embodiments, dry layup includes placing a plurality of pre-impregnated fibers on top of each other. In some embodiments, molding may include using a prepreg or pre-impregnated method. "Prepreg" method as described in this disclosure is a method in which a reinforcement material such as carbon fiber is pre-impregnated with resin prior to pouring. Pre-impregnated may include a composite having carbon fiber and resin wherein the composite can be placed into a mold and cured without an addition of resin or carbon fiber. In some embodiments, pre-impregnated may include an uncured resin. In some embodiments, pre-impregnated may include a partially cured resin wherein the resin may still be formed into another shape prior to complete curing. In some embodiments, pre-impregnated further includes a resin ration wherein the resin ratio is a predetermined ratio to resin to carbon fiber material. In some embodiments, pre-impregnated process further includes storing the pre-impregnated fibers in a cool area prior to molding. In some embodiments, pre-impregnated process may further include curing using heat in a device such as an autoclave. Pre-impregnated may further include any pre-impregnated process described in this disclosure. In some embodiments, molding may further include using an infusion process. An "infusion process" is a process in which resin is injected or drawn into a dry laminate containing the reinforcement material (such as carbon fiber material) using a vacuum. In an infusion process, the reinforcement material is first placed into a mold and the resin is drawn into a mold such that the resin takes the form of the mold. In an infusion process, the reinforcement material may be compacted using a vacuum before the resin is drawn in. an infusion process may be preferred in materials that require a higher concentration of reinforcement material in comparison to the resin. In an infusion process, void may be minimized as air pockets are sucked out prior to the resin being drawn into the laminate. Infusion process may also be referred to as a vacuum infusion process. In some embodiments, molding may further include resin transfer molding. Molding may include a Resin Transfer Molding. Resin Transfer Molding as described is a closed molding process wherein resin is injected into a mold having a dry composite, such as carbon fiber material, and clamped together. Additional disclosure on molding may further be found in U.S. patent application Ser. No. 18/118,827, filed on Mar. 8, 2023, and titled "AIRCRAFT WITH COMPOSITE ASSEMBLY AND A METHOD OF MANUFACTURE," This may be implemented, without limitation, as described above in reference to FIGS. 1-4.

With continued reference to FIG. 4, molding first molded part may further include assembling a composite laminate, the composite laminate having a plurality of layers, wherein at least one of the plurality of layers contains the resin and the carbon fiber material. Additionally, or alternatively, more than one of the plurality of layers may contain the resin and the carbon fiber material. Additionally, or alternatively, plurality of layers may be oriented in a parallel direction. Additionally or alternatively, plurality of layers may be oriented in differing directions with respect to each other. In some embodiments, stitching is structured to bind a plurality of layers. In some embodiments, stitching extends through a top of composite assembly and through a bottom of composite assembly. In some embodiments, stitching extends through carbon fiber material. In some embodiments plurality of layers comprise a quasi-isotropic layup. In some embodiments, first molded part may include a stitched resin infused carbon fiber cloth. In some embodiments, carbon fiber material includes a pre-impregnated carbon fiber material. This may be implemented, without limitation, as described above in reference to FIGS. 1-4.

With continued reference to FIG. 4, a stitching process may include placing a plurality of layers of carbon fiber materials on top of each other. Stitching may further include sewing a stitching material through the plurality of layers of carbon fiber material. The plurality of layers may be stitched together such that the plurality of layers does not move during a molding process such as resin transfer molding as described below. The plurality of layers may further be stitched together in order to prevent delamination of a molded part. The layers may further be stitched together in order to increase the strength of the molded part in a direction perpendicular to the orientation of the carbon fiber material. In some cases, stitching may include a lockstitch method wherein two threads are stitched and firmly linked together. In some cases, a plurality of carbon fiber material is bonded together prior to molding wherein the bonding prevents slipping during a molding process.

With continued reference to FIG. 4, step 415 of method 400 includes molding a second molded part. Molding second molded part may include any molding process as described in this disclosure. This may be implemented, without limitation, as described above in reference to FIGS. 1-4.

With continued reference to FIG. 4, step 420 of method 400 includes adhering first molded part to second molded part to create a unified molded part. Adhering first molded part to second molded part may include molding first molded part to second molded part. In some embodiments, adhering first molded part to second molded part may include stitching first molded part to second molded part. In some embodiments, adhering first molded part to second molded part may further include curing first molded part and second molded part simultaneously. In some embodiments, first molded part and second molded part contain an uncured resin wherein uncured resin of first molded part and uncured resin of second molded part may mix to create a single resin matrix. The single resin matrix may then be cured to create a unified molded part. In some embodiments, adhering first molded part to second molded part to create unified molded part may further include, orienting second molded part relative to first molded part to create a joining region, wherein joining region includes a portion of first molded part and a portion of second molded part. Adhering first molded part may further include molding joining region. Molding joining region may include placing joining region in a joining mold and pouring a resin into joining mold. "Joining mold" as described herein is a component used to shape and form a joining region of two or more molded parts as described in this disclosure. Placing joining region into joining mold may include placing a portion of first molded part and a portion of second molded part into joining mold. Portion of first molded part and/or portion of second molded part may contain a plurality of carbon fibers that are not embedded within a resin matrix. Portion of first molded part and portion of second molded part may be stitched together prior to pouring a resin into joining mold. In some cases, portion of first molded part and/or portion of second molded part is partially or fully cured wherein portion of first molded part may be situated above portion of second molded part, wherein a resin may then be poured into joining mold to create a joining region. Adhering first molded part to second molded part may further include curing joining region. This may be implemented, without limitation, as described above in reference to FIGS. 1-4.

With continued reference to FIG. 4, a molding process, such as resin transfer molding as described above may include preparing a mold. First a mold is created or shaped in order to take the shape of the final product. Next, layers of reinforcement material such as carbon fiber material are placed within the mold. The carbon fiber material may be placed in a similar orientation as each other or in differing orientations. The carbon fiber material is cut and shaped in order to complement the shape of the mold. Once the carbon fiber material is placed within the mold, the mold is placed within a vacuum bag. The vacuum bag is then sealed in order to create an airtight mold. Once the vacuum bag is sealed, resin along with a catalyst or hardener is injected into the mold. The resin may be injected using a vacuum wherein a vacuum draws the resin into the mold using negative pressure within the vacuum bag. Once the resin is injected into the mold, it is left to cure. In some cases, the resin may be cured quicker by heating the molded part. For example, when a thermoset resin is used, resin may be cured by applying heat to the thermoset resin. However, it is to be understood that heating is not required in order to cure the resin. In some cases, resin transfer molding may include High pressure resin transfer molding wherein resin is injected into the vacuum bag at a higher pressure. In some cases, resin is transferred at a pressure of up to 200 bar. In contrast resin transfer molding, also known as low-pressure resin transfer molding, may inject resin at a pressure of 10-20 bars. High pressure resin transfer molding may increase molding time. In some cases, Resin transfer molding includes high temperature resin transfer molding wherein resin may be injected to the vacuum bag at a temperature of up to 300 degrees and cured at a temperature between 340 and 370 degrees. A molding process such as resin transfer molding may include parts such as the mold, the reinforcement material such as carbon fiber, the resin along with a catalyst, a vacuum bag, a vacuum, and heating equipment in order to heat the resin. A molded part created during the molding process may be cured in a plurality of ways. The molded part may first be cured by heating the molded part. Resin within molded part may include a thermoset resin wherein the resin is cured after a heat is applied to the resin. heat may vary from between 100 degrees Celsius and may exceed 300 degrees Celsius. Molded part may be placed into an autoclave to be cured. In some cases, molded part may be placed in a cooler area such as freezer in order to prevent curing of molded part until curing is described. Molded part may also be cured through the passage of time. When a catalyst is mixed with a resin, the resin slowly cures over the passage of time through a chemical reaction. The resin and catalyst mixture may be set in a room temperature environment. Resin may further be cured using UV light. In some cases, resin may not require a catalyst and instead require UV light to cure the resin. In some cases, curing may involve a combination of the processes as described above. for example, curing may involve a post curing process wherein a molded part is exposed to a higher temperature in order to speed up the curing and maximize the physical properties of the material. A post curing process may take place when the resin is mixed with a catalyst. In some cases, curing a composite may take several minutes. In some cases, curing a composite may take longer such as an hour or a day.

With continued reference to FIG. 4, at step 425, method 400 includes attaching unified molded part to a structural element of blended wing body aircraft. Attaching as described herein may include stitching and/or riveting. In some embodiments, attaching unified molded part to structural element may include stitching unified part to structural element. Stitching may include any stitching method or process as described herein. In some embodiments, structural element may be comprised of a composite laminate having a carbon fiber material such that stitching may pass or pierce through structural element and unified molded such that structural element and unified molded part are stitched together. In some embodiments, stitching may include surrounding structural element with stitching material. For example, stitching may include wrapping a stitching material around structural element and piercing unified molded part with stitching material such that structural element is bound to unified molded part. In some embodiments, stitching may include receiving a carbon fiber cloth wherein the carbon fiber cloth is wrapped around structural element. Additionally, a first and second end of carbon fiber cloth may be stitched to unified molded part. In some embodiments, unified molded part may further include a receiving portion wherein receiving portion is configured to receive structural element, for example, composite assembly may contain a protrusion suitable to receive a rod. In some embodiments, adhering unified molded part to structural element includes placing structural element into receiving portion of unified molded part. Additionally or alternatively, structural element may be adhered using stitching, adhesives, epoxy or the like. In some embodiments, attaching unified molded part to structural element includes riveting unified molded part to structural element.

With continued reference to FIG. 4, forming the blended wing body further includes assembling the at least an outer skin surface, the at least a structural element and the at least a portion of main body. In some embodiments, assembling the at least an outer skin surface, the at least a structural element and the at least a portion of main body may include assembling in a sequence or simultaneously. In some embodiments, assembling may include connecting two or more parts together through an additional molding process wherein the parts are connected using resin, textiles, carbon fiber and the like. Assembling may further include connecting two or more parts using rivets, stitching, adhesives, an overlay of layers, an overlay of flaps and the like. Assembling may further include connecting two or more parts together using any form of attachment as well. In some embodiments, assembling the at least an outer skin surface, the at least a structural element and the at least a portion of main body may include assembling the parts simultaneously, or in a sequence of steps. This may be implemented, without limitation, as described above in reference to FIGS. 1-4.

With continued reference to FIG. 4, composite assembly may be configured to contain a pressure vessel. This may be implemented, without limitation, as described above in reference to FIGS. 1-4.

Figure 5:
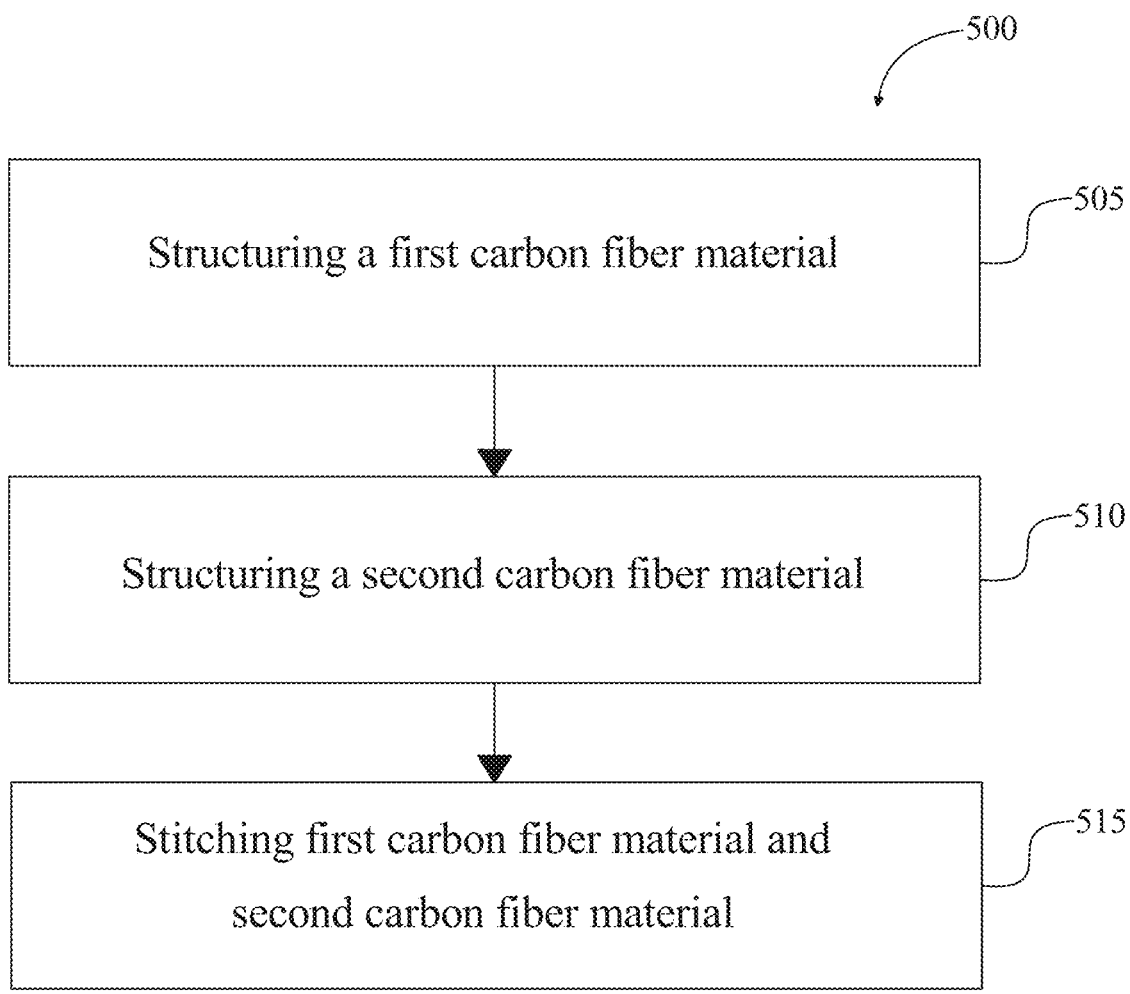
FIG. 5 is a flow diagram of another exemplary method of manufacture of a composite assembly for an aircraft.

Referring now to FIG. 5, an exemplary method 500 of manufacture for a composite assembly for an aircraft is illustrated by way of a flow diagram. At step 505, the method 500 may include structuring a first carbon fiber material for a portion of an outer skin surface of an aircraft. As used in this disclosure, "structuring" is an act of arranging a material, such as a carbon fiber material, into a desired shape, structure, form, or arrangement. In some cases, structuring may include cutting or modifying the material being structured. Structuring may include arranging a material relative another; structuring may include placing a material into a form or mold. In some cases, structing a carbon fiber material for a portion of an outer skin surface may include arranging the carbon fiber material for placement in a mold. Mold may include a lay-up (e.g., single-sided) mold. Alternatively or additionally, mold may include a two-sided mold. Structuring may occur prior to, or in anticipation of, molding. Structuring may also be said to occur during molding or any other forming process. First carbon fiber material may include any carbon fiber material described in this disclosure, for example in FIGS. 1-4. Outer skin surface may include any outer skin surface described in this disclosure, for example in FIGS. 1-4. Aircraft may include any aircraft described in this disclosure, for example in FIGS. 1-4. In some cases, aircraft may include a blended wing body aircraft having no clear demarcation between wings and a main body along a leading edge of the blended wing body aircraft. In some embodiments, first carbon fiber material may additionally include a dry carbon fiber material. Dry carbon fiber material may include any dry carbon fiber material described in this disclosure, for example with reference to FIGS. 1-4. In some cases, dry carbon fiber material may be no less than 1, 10, 20, 50, 75, or 100 inches wide.

With continued reference to FIG. 5, at step 510, method 500 may include structuring a second carbon fiber material for a structural component of aircraft. Second carbon fiber material may include any carbon fiber material described in this disclosure, for example in FIGS. 1-4. Structural component may include any structural component described in this disclosure, for example in FIGS. 1-4.

With continued reference to FIG. 5, at step 515, method 500 may include stitching second carbon fiber material to first carbon fiber material. Stitching may include any stitching described in this disclosure, for example in FIGS. 1-4. In some cases, stitching may additionally include binding first carbon fiber material and second carbon fiber material. Binding may include any binding described in this disclosure, for example in FIGS. 1-4.

Still referring to FIG. 5, in some embodiments, one or more of first carbon fiber material and second carbon fiber material may additionally include a composite laminate including a plurality of layers. Composite laminate may include any composite laminate described in this disclosure, for example with reference to FIGS. 1-4. Layers may include any layer described in this disclosure, for example with reference to FIGS. 1-4. In some cases, stitching may additionally include binding plurality of layers together. In some cases, plurality of layers may include a quasi-isotropic layup.

Still referring to FIG. 5, in some embodiments, method 500 may additionally include forming a unified molded part comprising first carbon fiber material and second carbon fiber material. Unified molder part may include any unified molder part described in this disclosure, for example with reference to FIGS. 1-4. In some cases, forming unified molded part may additionally include embedding a resin matrix within both first carbon fiber material and second carbon fiber material. Resin matrix may include any resin matrix or resin described in this disclosure, for example with reference to FIGS. 1-4. In some embodiments, composite assembly may be configured to contain a pressure vessel. Pressure vessel may include any pressure vessel described in this disclosure, for example with reference to FIGS. 1-4. In some embodiments, aircraft includes a single deck, wherein a cargo compartment and a passenger compartment are located on or above the single deck.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
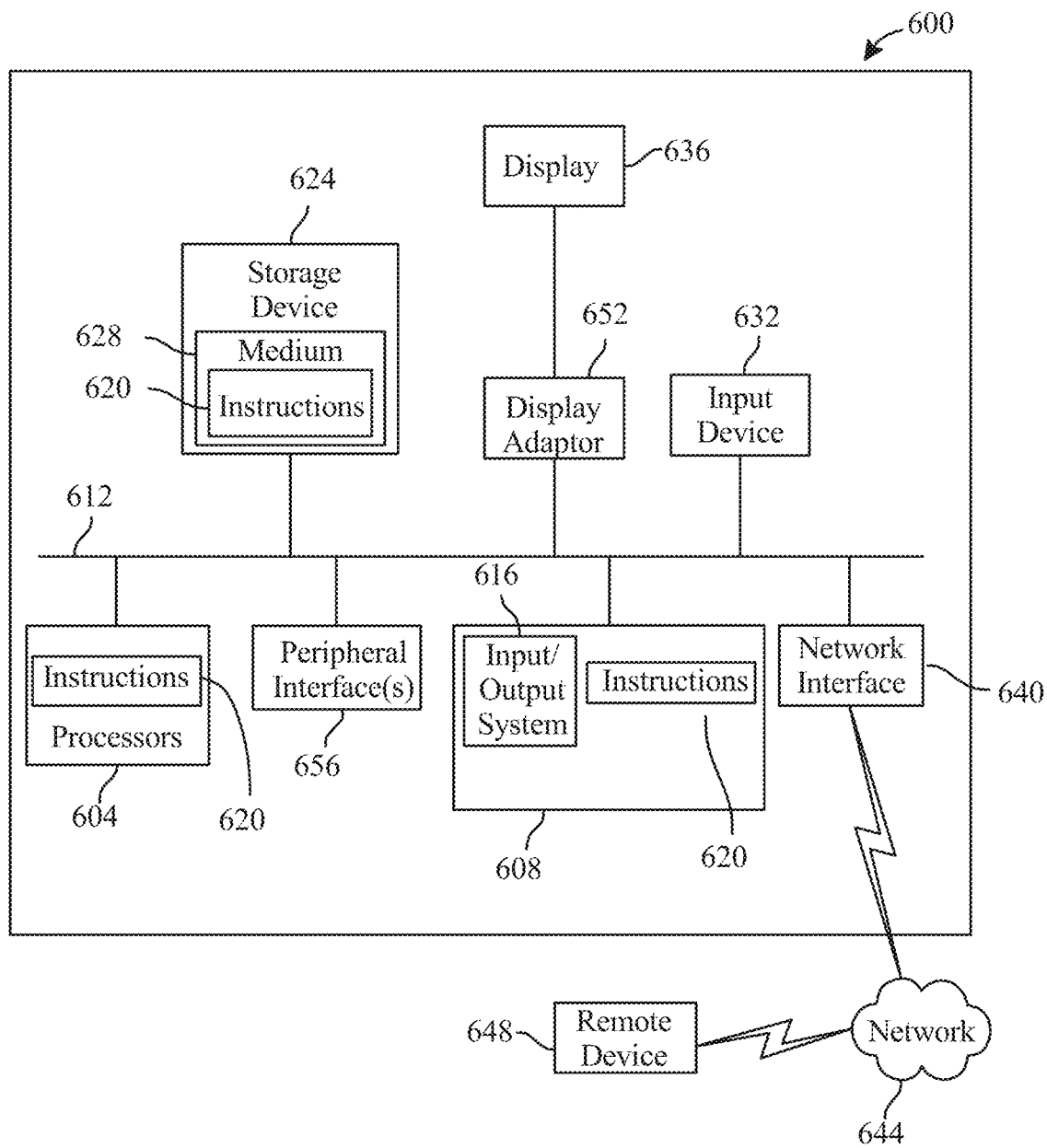
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 662 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A blended wing body (BWB) aircraft with composite assembly comprising:
   a structural element comprising a skeletal frame of a BWB aircraft, wherein the skeletal frame comprises:
      a main body element; and
      at least one wing element connected to the main body element; and
   a composite assembly attached to the skeletal frame and forming an outer skin of the BWB aircraft, wherein the composite assembly comprises:
      a first carbon fiber material structured for a portion of an outer skin surface of the skeletal frame of the BWB aircraft; and
      a second carbon fiber material stitched to the first carbon fiber material, wherein the second carbon fiber material comprises an outermost skin layer of the BWB aircraft; and wherein:
         the stitching is configured to bind the first carbon fiber material and the second carbon fiber material, and wherein the aircraft further comprises a single deck, wherein a cargo compartment and a passenger compartment are located on or above the single deck; and
         a combination of the skeletal frame and the composite assembly form the BWB aircraft comprising a fixed-wing aircraft body having no clear or abrupt demarcation between wings and a main body of the BWB aircraft along a leading edge of the BWB aircraft.

2. The BWB aircraft of claim 1, wherein one or more of the first carbon fiber material and the second carbon fiber material further comprise a composite laminate comprising a plurality of layers.

3. The BWB aircraft of claim 2, wherein the stitching is structured to bind the plurality of layers together.

4. The BWB aircraft of claim 2, wherein the plurality of layers comprises a quasi-isotropic layup.

5. The BWB aircraft of claim 1, further comprising a unified molded part comprising the first carbon fiber material and the second carbon fiber material.

6. The BWB aircraft of claim 5, wherein the unified molded part further comprises a resin matrix embedded within both the first carbon fiber material and the second carbon fiber material.

7. The BWB aircraft of claim 1, wherein the first carbon fiber material further comprises a dry carbon fiber material.

8. The BWB aircraft of claim 7, wherein the dry carbon fiber material is no less than 10 inches wide.

9. The BWB aircraft of claim 1, wherein the composite assembly contains a pressure vessel which forms at least a portion of an interior of the main body of the BWB aircraft.

10. A method of manufacture for a blended wing body (BWB) aircraft with composite assembly, the method comprising:

providing a structural element comprising a skeletal frame of a BWB aircraft, wherein the skeletal frame comprises:
  a main body element; and
  at least one wing element connected to the main body element; and
attaching a composite assembly to the skeletal frame, wherein the composite assembly forms an outer skin of the BWB aircraft, wherein attaching the composite assembly to the skeletal frame comprises:
  attaching a first carbon fiber material structured for a portion of an outer skin surface of the skeletal frame of the BWB aircraft; and
  stitching a second carbon fiber material to the first carbon fiber material, wherein the second carbon fiber material comprises an outermost skin layer of the BWB aircraft, wherein:
    the stitching further comprises binding the first carbon fiber material and the second carbon fiber material, wherein the aircraft comprises a single deck, wherein a cargo compartment and one or more passengers are located on or above the single deck; and
    a combination of the skeletal frame and the composite assembly form a BWB aircraft comprising a fixed-wing aircraft body having no clear or abrupt demarcation between wings and a main body of the BWB aircraft along a leading edge of the BWB aircraft.

11. The method of claim 10, wherein one or more of the first carbon fiber material and the second carbon fiber material further comprise a composite laminate comprising a plurality of layers.

12. The method of claim 11, wherein the stitching further comprises binding the plurality of layers together.

13. The method of claim 11, wherein the plurality of layers comprises a quasi-isotropic layup.

14. The method of claim 10, further comprising:
  forming a unified molded part comprising the first carbon fiber material and the second carbon fiber material.

15. The method of claim 14, wherein forming the unified molded part further comprises:
  embedding a resin matrix within both the first carbon fiber material and the second carbon fiber material.

16. The method of claim 10, wherein the first carbon fiber material further comprises a dry carbon fiber material.

17. The method of claim 16, wherein the dry carbon fiber material is no less than 10 inches wide.

18. The method of claim 10, wherein the composite assembly contains a pressure vessel which forms at least a portion of an interior of the main body of the BWB aircraft.

* * * * *